Nov. 29, 1966    R. T. SLOAN    3,289,051
SEALED ELECTRICAL APPARATUS
Filed March 4, 1963

Inventor
Richard T. Sloan
by Sidney Greenberg
His Attorney

United States Patent Office 3,289,051
Patented Nov. 29, 1966

3,289,051
SEALED ELECTRICAL APPARATUS
Richard T. Sloan, Columbia, S.C., assignor to General
Electric Company, a corporation of New York
Filed Mar. 4, 1963, Ser. No. 262,732
6 Claims. (Cl. 317—230)

The present invention relates to seal structures and more particularly to a seal assembly for electrical devices such as electrolytic capacitors.

A frequent cause of failure of electrolytic capacitors is the loss of electrolyte through inadequate seals provided for the capacitor case. Such loss leads to variation and degradation of the electrical properties of the unit, as well as premature breakdown. Prior seal structures used for electrolytic capacitors have not in general provided entirely satisfactory results for various reasons. For example, certain of the prior seal structures have not effectively prevented escape of the electrolyte liquid or vapor emanating therefrom, while in those cases where such escape was avoided, the build-up of vapor or gas pressure within the unit often resulted in ejection of the end seal. In many instances, difficulties were encountered due to creepage of the electrolyte along the anode lead wire and its eventual contact with the casing, resulting in an electrical connection between the anode and the cathode through the casing and thus causing a short circuit of the capacitor.

It is an object of the invention to provide an electrical device, and especially an electrolytic capacitor, which has an effective and long lasting seal and avoids the disadvantages of the prior art seal structures of this type.

It is another object of the invention to provide a seal structure for electrical devices such as electrolytic capacitors which is characterized by a strong, electrically insulating, hermetic seal which prevents escape of the contained liquid or vapor, which has high mechanical strength to resist internal pressure, which forms an effective vapor barrier, and which is economically and readily produced.

Other objects and advantages will become apparent from the following description and accompanying claims.

With the above objects in view, the present invention relates in a preferred embodiment to an electrical capacitor comprising, in combination, a casing containing an electrolyte and a capacitor section immersed therein, the casing having an opening therein and the capacitor section having a lead wire extending therefrom outwardly through the casing opening, a metal seal housing affixed to the casing at the casing opening and communicating with the interior of the casing, an assembly of superposed electrically insulating bushing members fitting within the metal seal housing and closing the casing opening with the lead wire passing therethrough, at least one of the bushing members being composed of a rigid fluid-impermeable material and another of the bushing members being composed of an elastomeric material, and a cap member cooperating with the seal housing for compressing the bushing members therebetween and providing a fluid-tight seal between the bushing members and the lead wire and between the bushing members and the metal seal housing.

The invention will be better understood from the following description, taken in conjunction with the accompanying drawing, in which.

Figure 1:
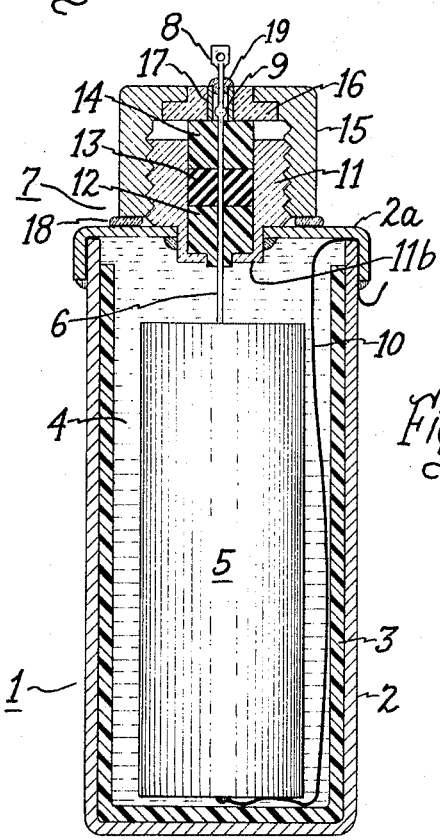
FIGURE 1 is a view partly in section of an electrolytic capacitor having a seal constructed in accordance with the invention.

Referring now to the drawing, and particularly to FIGURE 1, a capacitor 1 is shown comprising a casing 2 composed of any suitable metal material having a liner 3 of suitable insulating material such as kraft cardboard, and containing a liquid electrolyte 4. The electrolyte may be of any conventional or known type of electrolyte composition as, for example, an aqueous ammonium pentaborate-glycol solution, and it may be of liquid, gel, paste or other form. Immersed in electrolyte 4 is capacitor section 5 made in conventional manner of a pair of convolutely wound film-forming metal electrode foils such as tantalum, aluminum, or other known electrode metal of this type separated by kraft paper or other dielectric spacer material which is impregnated by the electrolyte. Lead wire 6 connected to the anode foil of capacitor roll section 5 extends outwardly through seal assembly 7 and is soldered or otherwise joined to terminal lead 8, the joint 9 being within the seal as more fully explained below. Terminal lead 8 is provided with a flat apertured outer end portion as shown for facilitating connection of external leads thereto.

Cathode lead 10 connected to the cathode foil of capacitor section 5 extends from the opposite end of the latter upwardly through the casing interior and passes outwardly of casing 2 from between cover 2a and casing 2, or the cathode lead may be brought out through a similar seal assembly as herein described in order to insulate the cathode lead from the casing.

The capacitor construction may be other than that shown as, for example, an arrangement wherein the casing 2 itself serves as the cathode. In such arrangement, only the anode, in suitable form, would take the place of capacitor section 5, cathode lead 10 would be dispensed with, and insulating liner 3 would be suitably modified.

Figure 2:
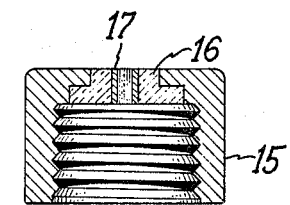
FIGURE 2 is an exploded view of the seal structure shown in FIGURE 1.
Figure 2:
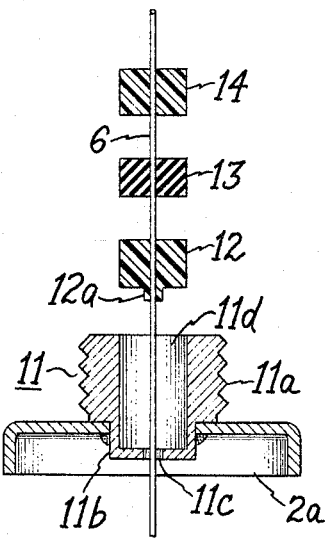

Seal assembly 7 comprises, as shown more clearly in the exploded view of FIGURE 2, a lower metallic seal housing 11 fitting within an opening in cover 2a and joined to the latter by soldering, welding or other means, as shown. Hollow seal housing 11 is formed with a threaded external surface 11a, a lower flange portion 11b having an axial opening 11c, and a cylindrical interior space 11d. Fitting within seal housing 11 with an interference fit is an assembly of superposed electrically insulating bushing members 12, 13, and 14. These members are essentially disc shaped except that lower bushing member 12 has a central axially projecting hub portion 12a which snugly fits into bottom aperture 11c of seal housing 11. Anode lead wire 6 passes axially through the assembly of superposed bushing members 12, 13, and 14.

Metal cap 15 is threaded internally and has an inner diameter dimensioned to fit over and threadably engage the outer threaded surface of housing member 11. The upper end of cap 15 is formed with a stepped opening in which fits a glass seal member 16 formed with a passage therethrough. Sealed in the latter passage is a tube 17 made preferably of a solderable metal such as nickel.

In the assembled condition, as shown in FIGURE 1, cap 15 is screwed down on seal housing 11 containing bushing members 12, 13, and 14 to compress the latter members and form a strong, tight seal, both around the anode lead wire 6 and the interior surface of seal housing 11. Hermetic sealing by the described assembly may be further ensured by applying solder at the annular gap between cap 15 and cover 2a, as shown by solder joint 18, to seal the threads of cap 15 and housing 11.

Bushing members 12 and 14 are made of an electrically insulating material which has low vapor transmission characteristics, is highly resistant to severe chemical and thermal conditions, is non-moisture absorbent and is highly resistant to wetting by water and chemical solvents.

A particularly preferred material for this purpose is polytetrafluoroethylene, known by the trademark Teflon. Other fluorocarbon plastics of this type having similar properties may also be used, such as polytrifluorochloroethylene, known by the trademark Kel–F. The expression "fluorinated polyethylene" as used herein is intended to include within its meaning the above-mentioned fluorocarbon synthetic resin as well as other halogen-substituted derivatives of polyethylene having similar characteristics. The material used for these bushing members may be modified by incorporating inorganic filler material such as glass to improve the rigidity of the material. Bushing members 12 and 14 serve primarily as barriers to vapor transmission through the seal assembly. As shown in FIGURE 1, anode lead 6 passes axially through the hub portion of bushing 12 so as to be electrically insulated thereby from flange 11b of metal housing 11. The fluorinated polyethylene composition of bushing members 12 and 14 effectively withstands elevated temperature conditions of 125° C. or higher, and being non-moisture absorbent, substantially eliminates the risk of a possible short circuit between terminal lead 8 and casing 2 due to accumulation of moisture, or other conductive contaminants.

Intermediate bushing member 13 is made of an elastomeric material which, due to its highly resilient nature, provides a constantly tight seal against housing member 11 and anode lead wire 6 even under severe thermal cycling conditions. A particularly preferred material for this purpose is butyl rubber. Other elastomers of natural or synthetic nature may be employed, such as those produced by polymerization of butadiene alone or with styrene, e.g., buna, Hycar; by polymerization of chloroprene, e.g., neoprene; and other rubber-substitute products known in the art. The expression "elastomer" as used herein is intended to include all such rubbery, highly resilient materials.

Glass seal 16 associated with cap 15 provides a hermetic seal between the latter and tube 17 and serves to insulate anode lead 6, as well as terminal lead 8, from metal cap 15, and its rigidity is sufficient to compress bushing members 12, 13, and 14 when cap 15 is tightly screwed down on seal housing 11. Glass seal 16 is a compression seal, and may be formed by thermally contracting preheated metal cap 15 around the glass body 16 when the latter is in molten condition in a mold with axial tube 17 arranged therein. Such a compression glass seal significantly contributes to the hermetic sealing of the capacitor, especially when solder 18 is applied between cap 15 and cover 2a as described previously.

Terminal lead 8 is preferably secured to tube 17 by solder 19 of any conventional composition such as lead-tin introduced into the outer end of tube 17 to provide sufficiently rigid support for making external lead connections to the projecting end of terminal lead 8, to afford good electrical connection of an external lead to lead 8, and to complete the sealing of the capacitor unit.

Anode lead 6 is typically composed of an anodized film-forming metal wire, e.g., tantalum, so that the anodic dielectric oxide film may prevent the electrolyte from contacting the bare metal and thereby causing a short-circuit to the metal casing 2. It is not practical to extend the anodized lead entirely through the seal assembly since it is difficult to solder or otherwise readily secure the projecting end thereof to tube 17, especially if the lead wire is made of tantalum. For this reason, a separate lead wire 8 made of solderable metal such as nickel, copper or the like is first butt-welded to the end of anode lead 6 and then soldered to tube 17 as already described.

A typical procedure which may be used in assembling the described seal structure is as follows. One or more capacitor sections are placed in a metal case 2, and cover 2a having metal seal housing 11 fixed thereto is soldered in place on casing 2, with anode lead 6 extending through and projecting above seal housing 11, and with cathode lead 10 passing between and projecting outwardly from cover 2a and casing 2. Electrolyte solution is then poured into the casing through the open end of housing member 11 and the latter is then thoroughly dried. Bushing discs 12, 13 and 14 are pushed onto anode lead 6, which is provided with a sharpened end for this purpose, and the bushing discs are pressed with an interference fit into the interior space of seal housing 11. The sharpened end of anode lead 6 is then cut off, leaving a short portion projecting above upper bushing disc 14, and terminal lead 8 which extends through glass seal 16 of metal cap 15 is butt-welded to the projecting anode lead 6. Cap 15 is then screwed down tightly on seal housing 11, and terminal 8 is soldered to tube 17 in glass seal 16.

In typical constructions, casing 2 and cover 2a may be made of copper or brass, preferably silver plated to resist corrosion, or of aluminum. Seal housing 11 and cap 15 are typically made of cold rolled steel, which may be plated with nickel or silver or both. It is desirable that the glass material of seal 16 and metal cap 1 when made integral having matching thermal expansion characteristics to ensure maintenance of a tight seal therebetween under widely varying temperature conditions. Alternatively, the glass seal member may be made initially separate from cap 15 by joining it in sealing relation with a metal ring having matching thermal expansion characteristics, and the latter ring is then soldered, welded or otherwise suitably joined to metal cap 15, which in this case need not have thermal expansion characteristics matching those of the glass.

In a series of tests conducted on sealed capacitors constructed in accordance with the invention, five units (in which the threads of the seal housing were not sealed) were subjected to life tests at 35 volts D.C. at 125° C. for 250 hours and exposed a number of times to thermal cycling at temperatures ranging from −55° C. to 125° C. The average weight loss of these units at the end of the test period was found to be about 13 milligrams. Such results show a marked improvement over conventionally sealed units in which weight losses of 300–400 milligrams are usually encountered under similar conditions. The capacitance variation of the units of the invention after such testing was found to average only about 2.4%. Recordings made of leakage current in the tested units showed no evidence of contact between the electrolyte and the solderable terminal lead, thus further indicating the effectiveness of the seal assembly of the invention.

There is thus provided by the invention a seal structure which provides excellent retention of the fill electrolyte of the capacitor over long periods of time and significantly contributes to maintaining the electrical properties of the capacitor substantially constant. The described seal effectively prevents escape of the electrolyte along the lead wire and thereby avoids the risk of short circuiting the anode to the cathode through the casing while at the same time providing for readily solderable connections to the conducting terminal leads.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A sealed electrical assembly comprising, in combination, a casing containing an electrolyte and an electrical component immersed therein, said casing having an opening therein and said electrical component having a lead extending therefrom outwardly through said casing opening, a metal seal housing fixed to said casing at said casing opening and projecting into the casing interior and having an opening into said interior, an assembly of superposed electrically insulating bushing members fitting within said metal seal housing and closing said housing opening, said housing opening having a lesser area than the superposed bushing surfaces, said lead passing through the housing opening, at least one of said bushing members being composed of a rigid fluid-impermeable material and another of said bushing members being composed of an elastomeric material, and a metal cap member electrically insulated from said lead and cooperating with said seal housing for compressing said bushing members therebetween and providing fluid-tight seals between said bushing members and said lead and between said bushing members and said seal housing.

2. An electrical capacitor comprising, in combination a casing containing an electrolyte and a capacitor component immersed therein, said casing having an opening therein and said capacitor component having a lead extending therefrom outwardly through said casing opening, a metal seal housing fixed to said casing at said casing opening and projecting into the casing interior and having an opening into said interior, an assembly of superposed electrically insulating bushing members fitting within said metal seal housing and closing said housing opening, said housing opening having a lesser area than the superposed bushing surfaces, said lead passing through the housing opening, at least one of said bushing members being composed of a rigid fluid-impermeable material and another of said bushing members being composed of an elastomeric material, and a metal cap member electrically insulated from said lead and cooperating with said seal housing for compressing said bushing members therebetween and providing fluid-tight seals between said bushing members and said lead and between said bushing members and said seal housing.

3. An electrical capacitor comprising, in combination, a casing containing an electrolyte and a capacitor section immersed therein, said casing having an opening therein and said capacitor section having a lead extending therefrom outwardly through said casing opening, a metal seal housing fixed to said casing at said opening and communicating with the casing interior, and provided with an outer threaded surface, an assembly of superposed electrically insulating bushing members fitting within said metal seal housing and closing said casing opening with said lead passing therethrough, said assembly comprising a pair of bushing members composed of a rigid fluid-impermeable material having therebetween another bushing member composed of an elastomeric material, and a threaded metal cap member in threaded engagement with said metal seal housing for compressing said assembly of bushing members therebetween and providing fluid-tight seals between said bushing members and said lead and between said bushing members and said metal seal housing.

4. An electrical capacitor comprising, in combination, a casing containing an electrolyte and a capacitor section immersed therein, said casing having an opening therein and said capacitor section having a lead extending therefrom outwardly through said casing opening, a metal seal housing fixed to said casing at said opening and communicating with the casing interior, and provided with an outer threaded surface, an assembly of superposed electrically insulating bushing members fitting within said metal housing and closing said casing opening with said lead passing therethrough, said assembly comprising a pair of bushing members composed of a rigid fluid-impermeable material having therebetween another bushing member composed of an elastomeric material, and a threaded metal cap member in threaded engagement with said metal seal housing for compressing said assembly of bushing members therebetween and providing fluid-tight seals between said bushing members and said lead and between said bushing members and said metal seal housing, said metal cap member having a compression glass seal in the central portion thereof formed with a passage therethrough for receiving said lead therein, said glass seal bearing against said assembly of bushing members.

5. An electrical capacitor comprising, in combination, a casing containing an electrolyte and a capacitor section immersed therein, said casing having an opening therein and said capacitor section having a lead extending therefrom outwardly through said casing opening, said lead composed of a film-forming metal wire having an anodic dielectric oxide film thereon, a metal seal housing fixed to said casing at said opening and communicating with the casing interior, and provided with an outer threaded surface, an assembly of electrically insulating bushing members fitting within said metal seal housing and closing said casing opening with said lead passing therethrough, said assembly comprising a pair of bushing members composed of a rigid fluid-impermeable material having therebetween another bushing member composed of an elastomeric material, a threaded metal cap member in threaded engagement with said metal seal housing for compressing said assembly of bushing members therebetween and providing fluid-tight seals between said bushing members and said lead and between said bushing members and said metal seal housing, said metal cap member having a compression glass seal in the central portion thereof formed with a passage therethrough for receiving said lead therein, said glass seal bearing against said assembly of bushing members, and a solderable metal terminal lead joined to said film-formed lead wire and passing outwardly of said metal cap member.

6. An electrical capacitor comprising, in combination, a casing containing a fluid electrolyte and a capacitor section immersed therein, said casing having an opening therein and said capacitor section having a lead extending therefrom outwardly through said casing opening, said lead composed of a film-forming metal wire having an anodic dielectric oxide film thereon, a metal seal housing fixed to said casing at said opening and communicating with the casing interior, and provided with an outer threaded surface, an assembly of superposed electrically insulating bushing members fitting within said metal seal housing and closing said casing opening with said lead passing therethrough, said assembly comprising a pair of bushing members composed of a rigid fluid-impermeable material having therebetween another bushing member composed of an elastomeric material, a threaded metal cap member in threaded engagement with said metal seal housing for compressing said assembly of bushing members therebetween and providing fluid-tight seals between said bushing members and said lead and between said bushing members and said metal seal housing, said metal cap member having a compression glass seal in the central portion thereof formed with a passage therethrough for receiving said lead therein, a solderable metal tube lining said glass seal passage, said glass seal bearing against said assembly of bushing members, and a solderable metal terminal lead joined to said film-formed lead wire and passing outwardly of said metal cap member, said solderable metal terminal lead being soldered to said solderable metal tube in said glass seal.

References Cited by the Examiner
UNITED STATES PATENTS

| | | | |
|---|---|---|---|
| 2,957,041 | 10/1960 | Ziegler | 317—230 |
| 3,114,085 | 12/1963 | Ruscetta et al. | 317—230 |
| 3,131,337 | 4/1964 | Clement | 317—230 |

JOHN W. HUCKERT, *Primary Examiner.*

J. D. KALLAM, *Assistant Examiner.*